US009300882B2

(12) United States Patent
Tokutake

(10) Patent No.: US 9,300,882 B2
(45) Date of Patent: Mar. 29, 2016

(54) DEVICE AND METHOD FOR PANORAMIC IMAGE PROCESSING

(71) Applicant: Sony Corporation, Tokyo (JP)

(72) Inventor: Kenji Tokutake, Kanagawa (JP)

(73) Assignee: Sony Corporation, Tokyo (JP)

( * ) Notice: Subject to any disclaimer, the term of this patent is extended or adjusted under 35 U.S.C. 154(b) by 137 days.

(21) Appl. No.: 14/192,446

(22) Filed: Feb. 27, 2014

(65) Prior Publication Data
US 2015/0244944 A1     Aug. 27, 2015

(51) Int. Cl.
*H04N 5/232* (2006.01)
*H04N 5/265* (2006.01)
*H04N 21/24* (2011.01)

(52) U.S. Cl.
CPC ........... *H04N 5/265* (2013.01); *H04N 5/23238* (2013.01); *H04N 5/23296* (2013.01); *H04N 21/2407* (2013.01)

(58) Field of Classification Search
CPC . H04N 5/265; H04N 5/23238; H04N 1/3875; H04N 1/212; H04N 5/23296; H04N 21/2407
USPC .............. 348/36, 222.1, 239, 333.02, 333.12, 348/563, E5.044, E5.054
See application file for complete search history.

(56) References Cited

U.S. PATENT DOCUMENTS

| | | | | |
|---|---|---|---|---|
| 8,059,201 B2* | 11/2011 | Aarts | ...................... | G11B 27/10 348/564 |
| 9,055,216 B1* | 6/2015 | Taylor | ................ | H04N 5/23222 |
| 2007/0172133 A1* | 7/2007 | Kim | ........................ | H04N 1/41 382/232 |
| 2010/0097442 A1* | 4/2010 | Lablans | ................... | G03B 5/00 348/36 |
| 2010/0296571 A1* | 11/2010 | El-Saban | ......... | H04N 21/21805 375/240.01 |
| 2015/0189191 A1* | 7/2015 | Cucco | .................... | H04N 5/272 348/659 |

FOREIGN PATENT DOCUMENTS

JP       2013-101525 A     5/2013

* cited by examiner

*Primary Examiner* — Hung Lam
(74) *Attorney, Agent, or Firm* — Oblon, McClelland, Maier & Neustadt, L.L.P.

(57) ABSTRACT

A device includes one or more image sensors that capture live video data and a memory that stores the captured live video data. The device includes circuitry that determines an angle-of-view for one or more frames of the live video data and generates wide angle video data that has a larger angle-of-view than the one or more frames of the live video data. The circuitry determines one or more angles-of-view not represented in the wide angle video data by the live video data. The circuitry generates make-up image data captured at a later time than the live video data, wherein the make-up image data has an angle-of-view corresponding to at least one of the one or more angles-of-view that are not represented in the wide angle video data by the live video data. The circuitry updates the wide angle video data to include the make-up image data.

20 Claims, 14 Drawing Sheets

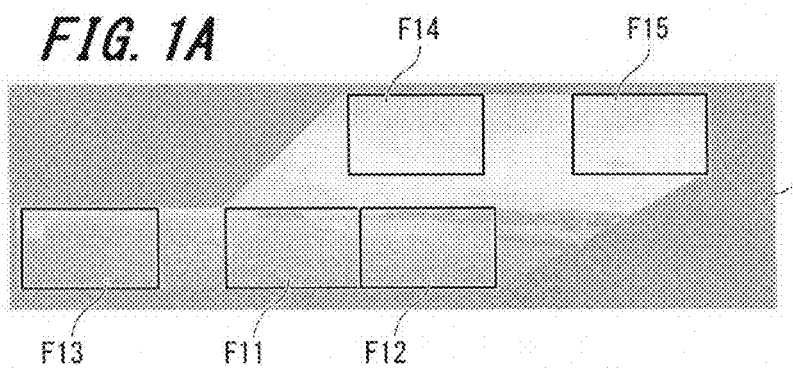
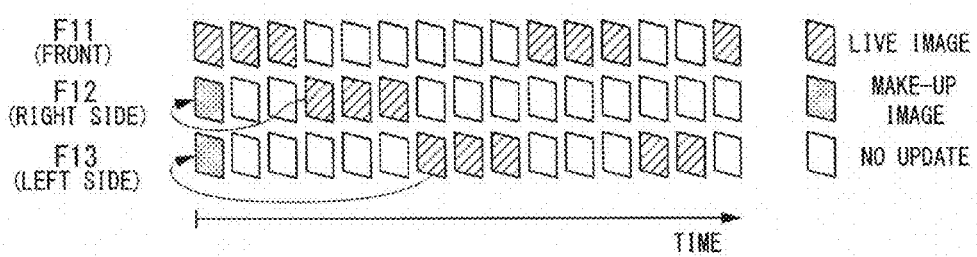
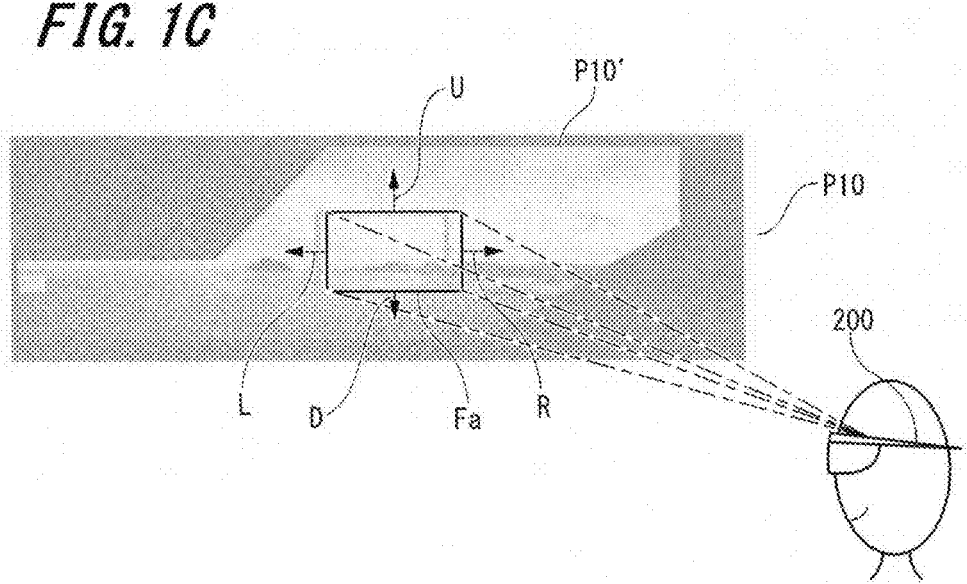

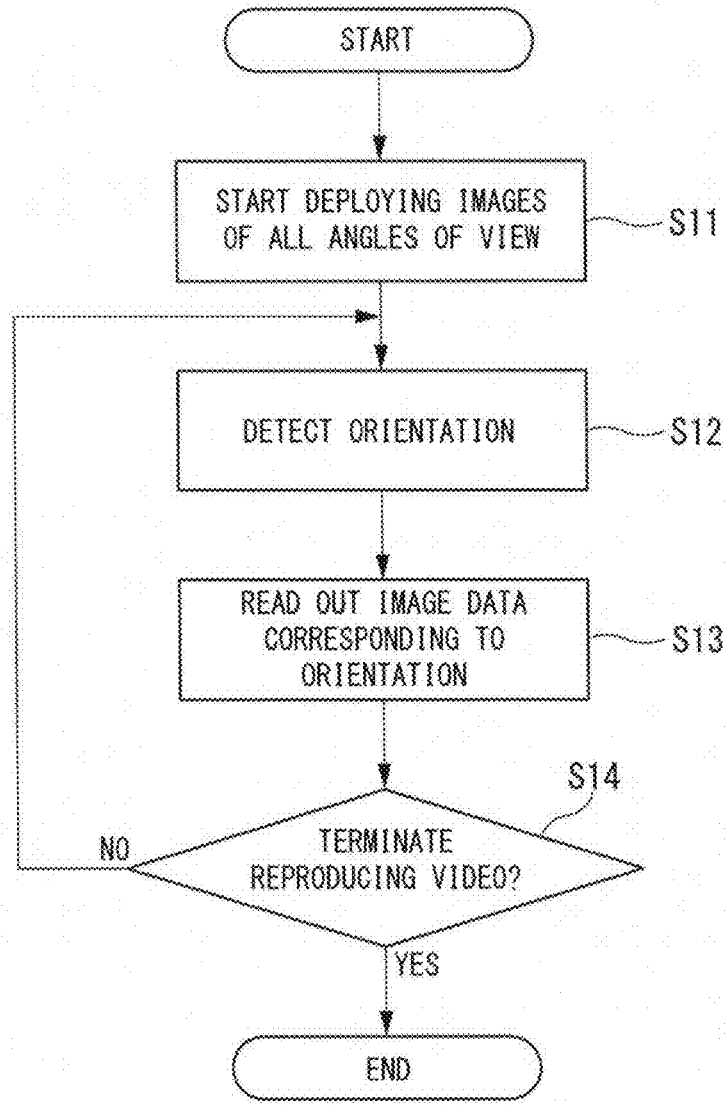

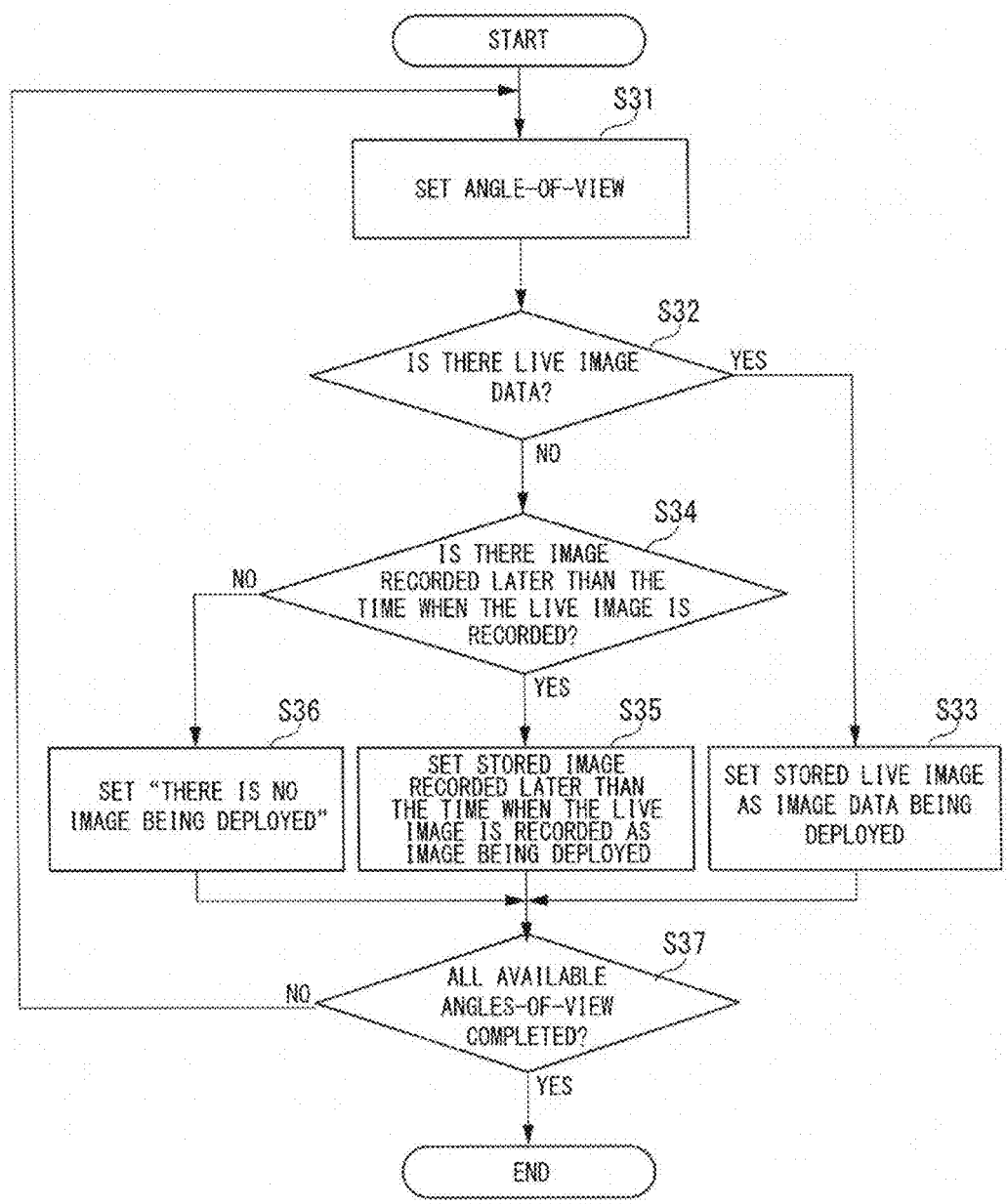

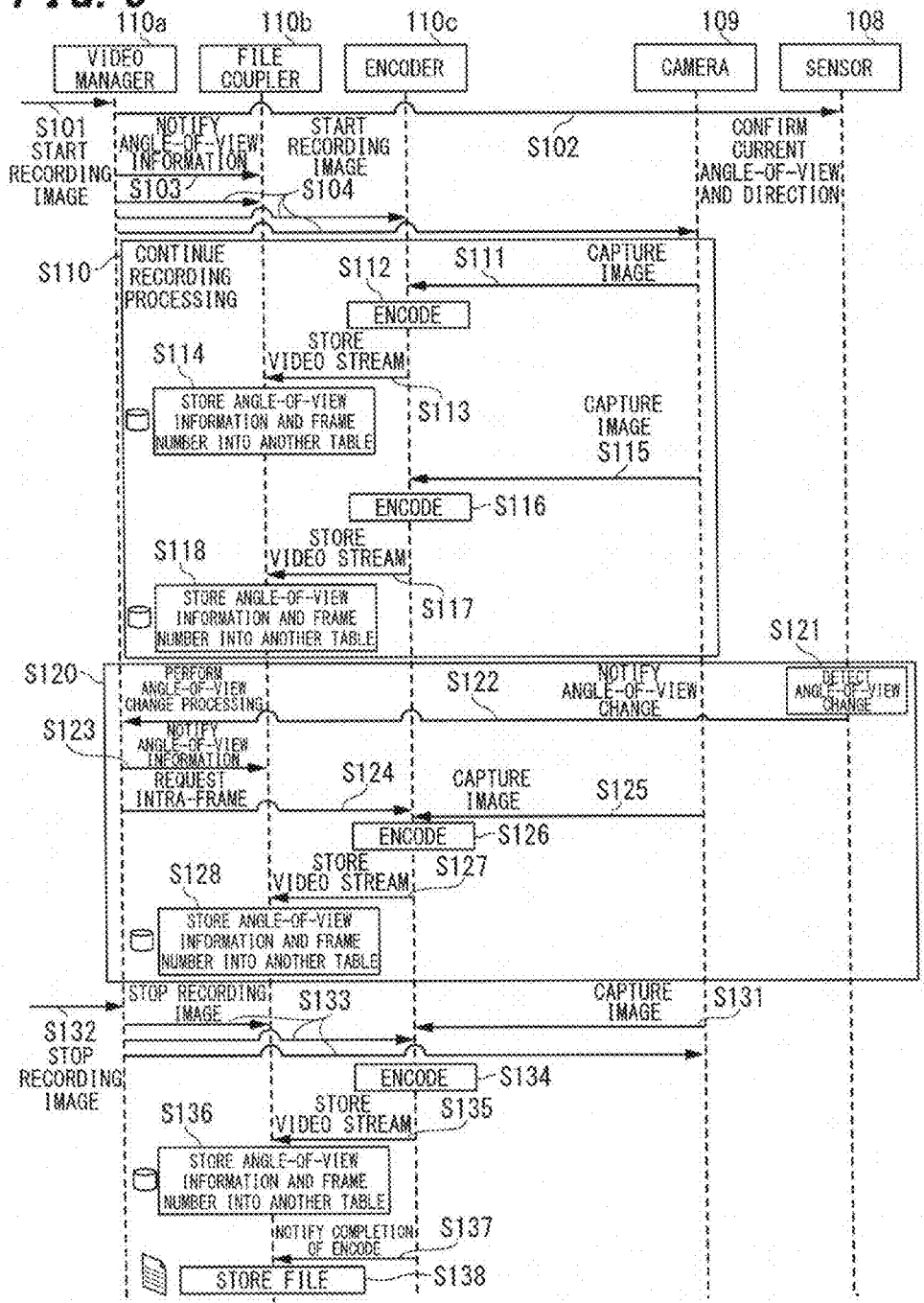

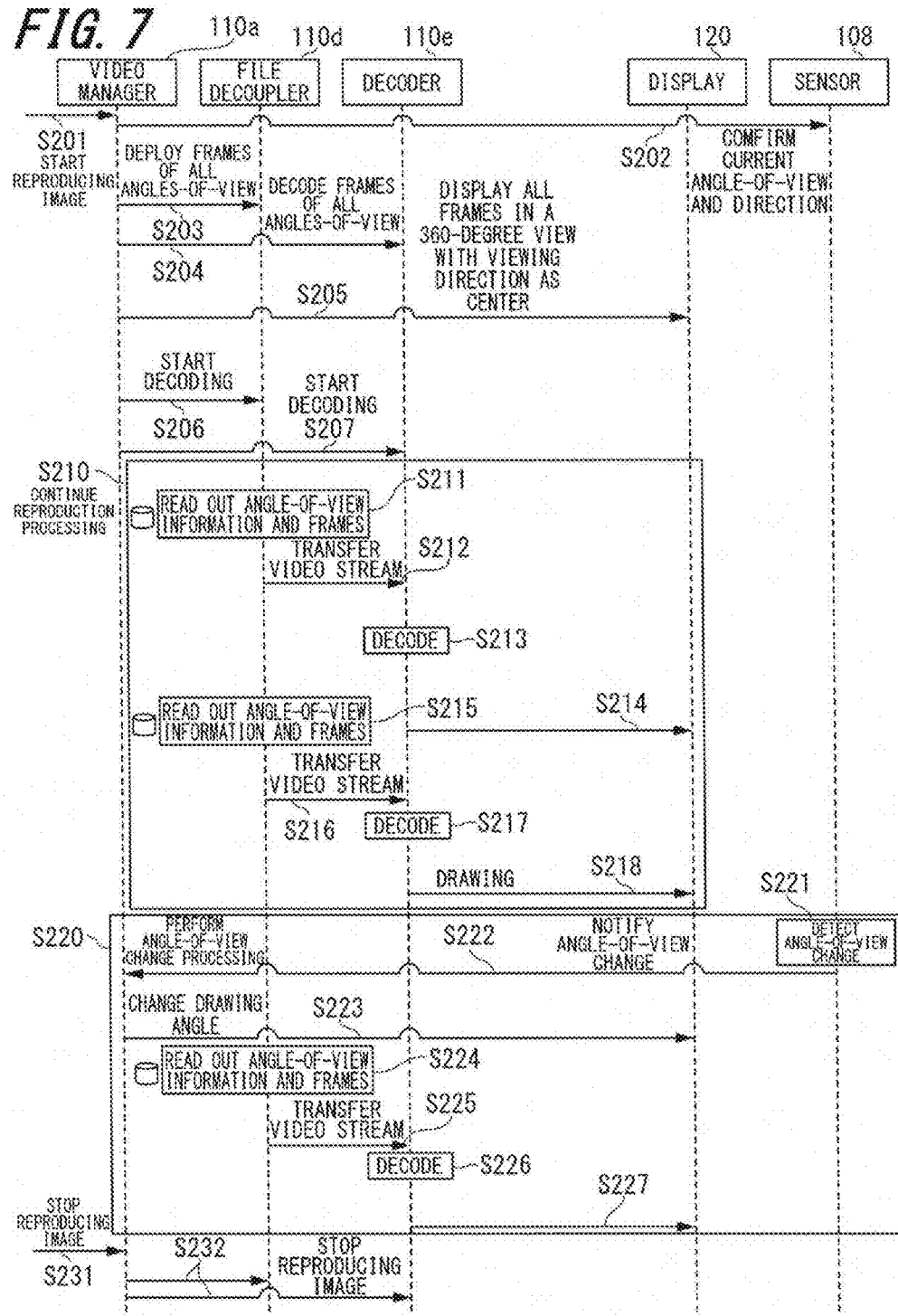

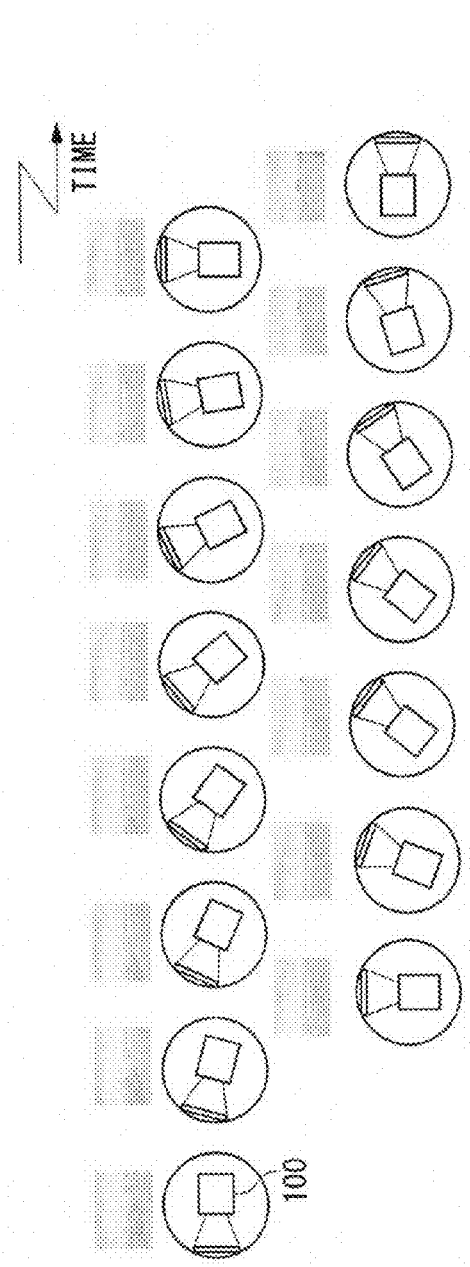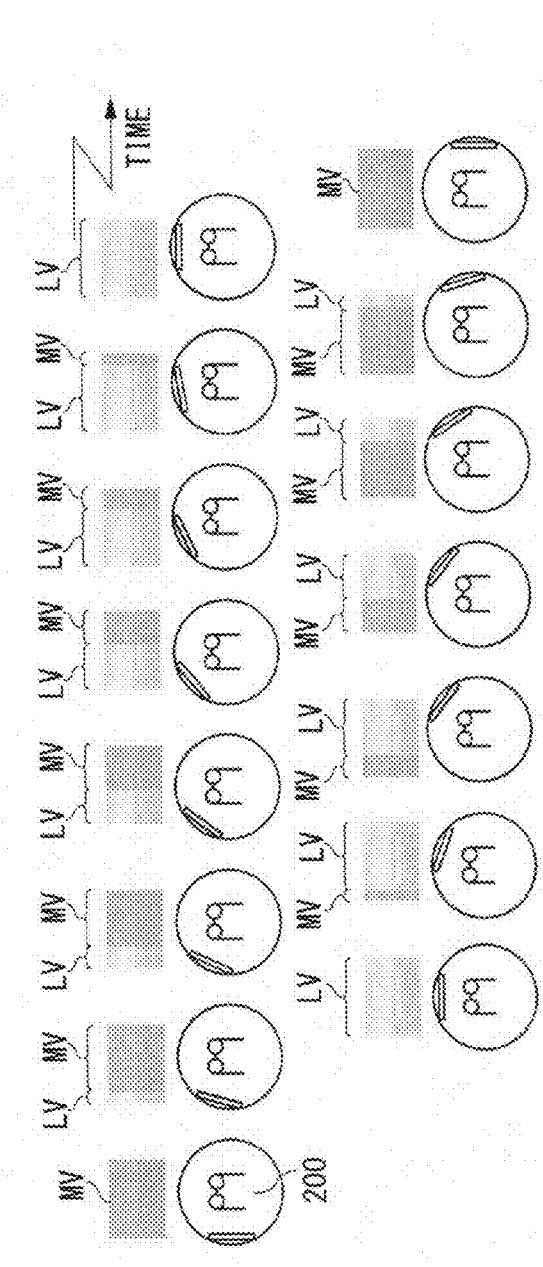

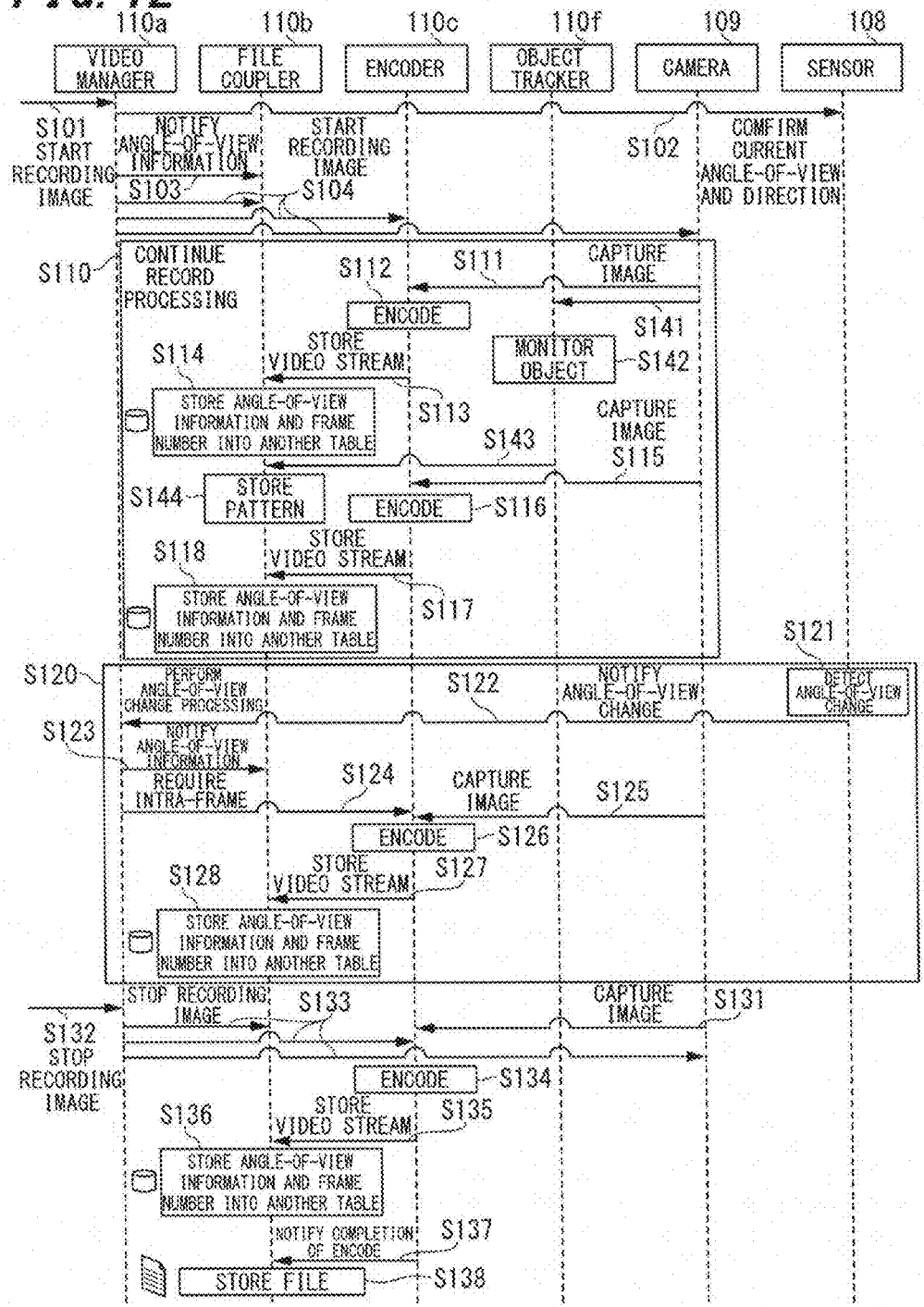

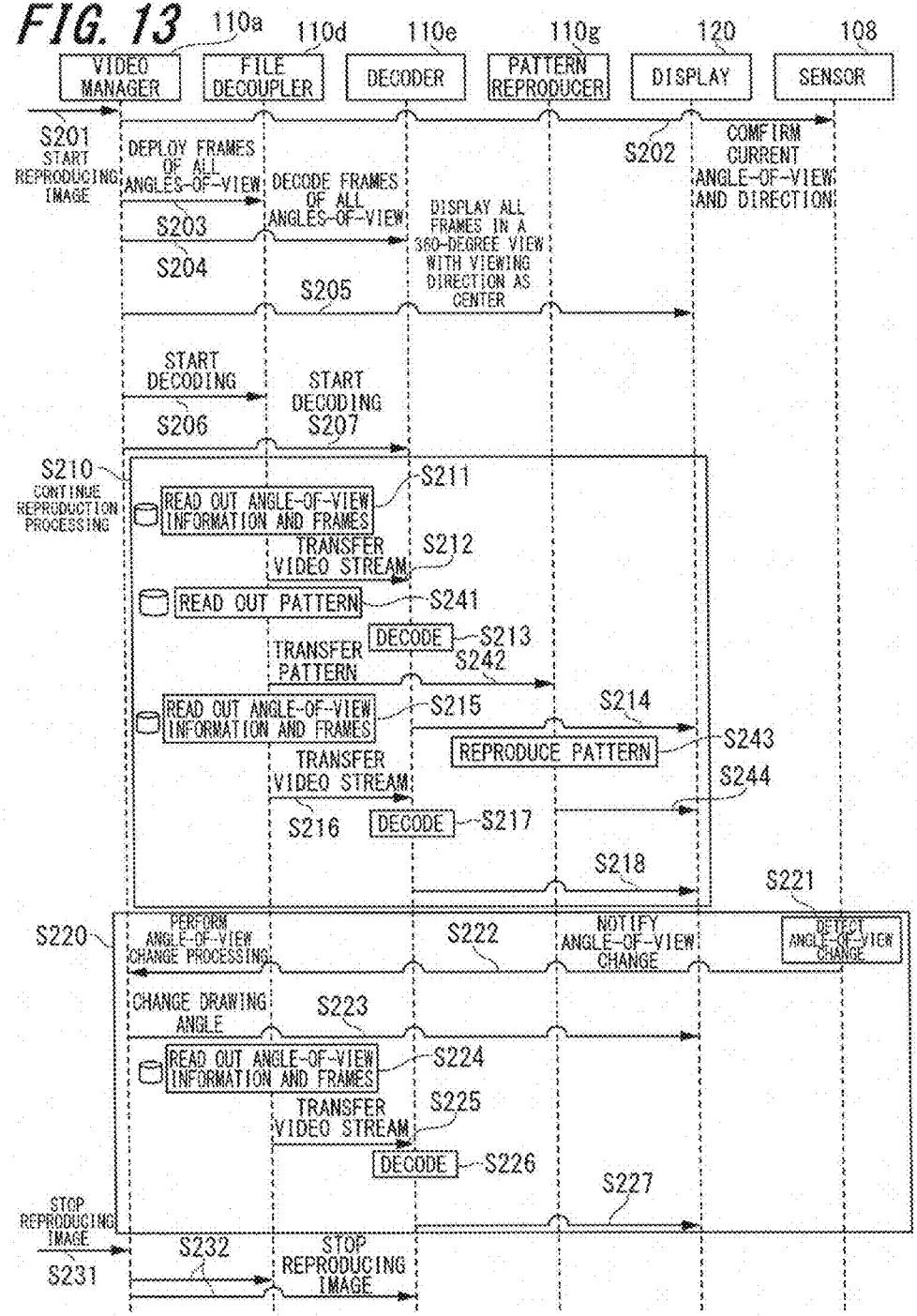

DEVICE AND METHOD FOR PANORAMIC IMAGE PROCESSING

BACKGROUND

1. Technical Field

The present disclosure relates to image processing and, in particular, the processing of video signals.

2. Description of Related Art

Terminal devices such as smartphones include cameras that can perform recording of moving images and/or still images. When recording a moving image or still image, the lens of the camera mounted on the terminal device captures an area in front of the lens with a finite angle-of-view. There exist some cameras that can capture images with a wide angle-of-view. For example, there exists a camera that can capture 360-degrees of the surrounding area with respect to the camera. Moreover, there exist cameras with installed video processing programs that can capture a plurality of images in an area surrounding the camera and connect the plurality of images such that a 360-degree panoramic image is obtained. For example, a user may have a terminal device with a camera that performs recording with a 45-degree angle-of-view. In this example, the user may capture eight images, whereby each of the images is captured after rotating the camera approximately 45-degrees such that a combination of the eight images forms a 360-degree panoramic image when the images are connected.

However, with respect to moving image data and related video signals, even if image data is captured by changing a direction of a camera, a 360-degree panoramic image (or size image having an angle-of-view greater than the recording angle-of-view of the camera) cannot be obtained with the moving image data. That is, in the case in which a video signal is captured by rotating a camera, the timings at which the live image data is obtained for each angle at which the camera is rotated will differ and therefore, the images cannot be combined to form a single panoramic image.

To illustrate the above problem by way of example, FIG. 15 illustrates a panoramic image P0, which represents a 360-degree angle-of-view. In this example, angle-of-view F0 represents the angle-of-view in which a camera used in the recording can actually capture an image. If video recording is performed while rotating the camera such that the angle-of-view changes from angle-of-view F1 to angle-of-view F2 to angle-of-view F3, a panoramic video image cannot be formed using the images captured with respect to each angle-of-view (as shown in panoramic images P1, P2, and P3) because live image data does not exist in the surrounding area with respect to each of the angle-of-views. In other words, because live image data can only be captured with respect to the angle-of-view in which the camera is currently facing, panoramic videos cannot be formed for a given time instant by combining a combination of moving image data in the limited angle-of-views because live image data does not exist at the different timings at which the recording was performed.

SUMMARY

In one or more embodiments according to the present disclosure, a device includes one or more image sensors that capture live video data and a memory that stores the captured live video data. The device includes circuitry configured to determine an angle-of-view for one or more frames of the live video data and to generate wide angle video data that has a larger angle-of-view than the one or more frames of the live video data. The circuitry is configured to determine one or more angles-of-view not represented in the wide angle video data by the live video data. The circuitry is configured to generate make-up image data captured at a later time than the live video data, wherein the make-up image data has an angle-of-view corresponding to at least one of the one or more angles-of-view that are not represented in the wide angle video data by the live video data. The circuitry is configured to update the wide angle video data to include the make-up image data.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 1A-1C illustrate an outline of video processing performed in one or more embodiments in accordance with the present disclosure;

FIG. 4 illustrates a non-limiting exemplary flow chart of processing related to the reproduction of video data stored in a memory, according to certain embodiments;

FIG. 5 illustrates a non-limiting exemplary flow chart for generating wide angle video data, according to certain embodiments;

FIG. 6 illustrates an exemplary sequential flow diagram at a time of recording video data, according to certain embodiments;

FIG. 7 illustrates an exemplary flow diagram of image data processing at a time of video reproduction, according to certain embodiments;

FIGS. 9A and 9B illustrate exemplary relationships between recording angle-of-view of a captured image and reproduction angle-of-view of a displayed image, according to certain embodiments;

FIG. 12 illustrates a non-limiting exemplary sequential flow diagram for simulating motion of a make-up image, according to certain embodiments;

FIG. 13 illustrates a non-limiting exemplary sequential flow diagram for reproducing images with simulated motion of a make-up image, according to certain embodiments;

DETAILED DESCRIPTION

Figure 2:
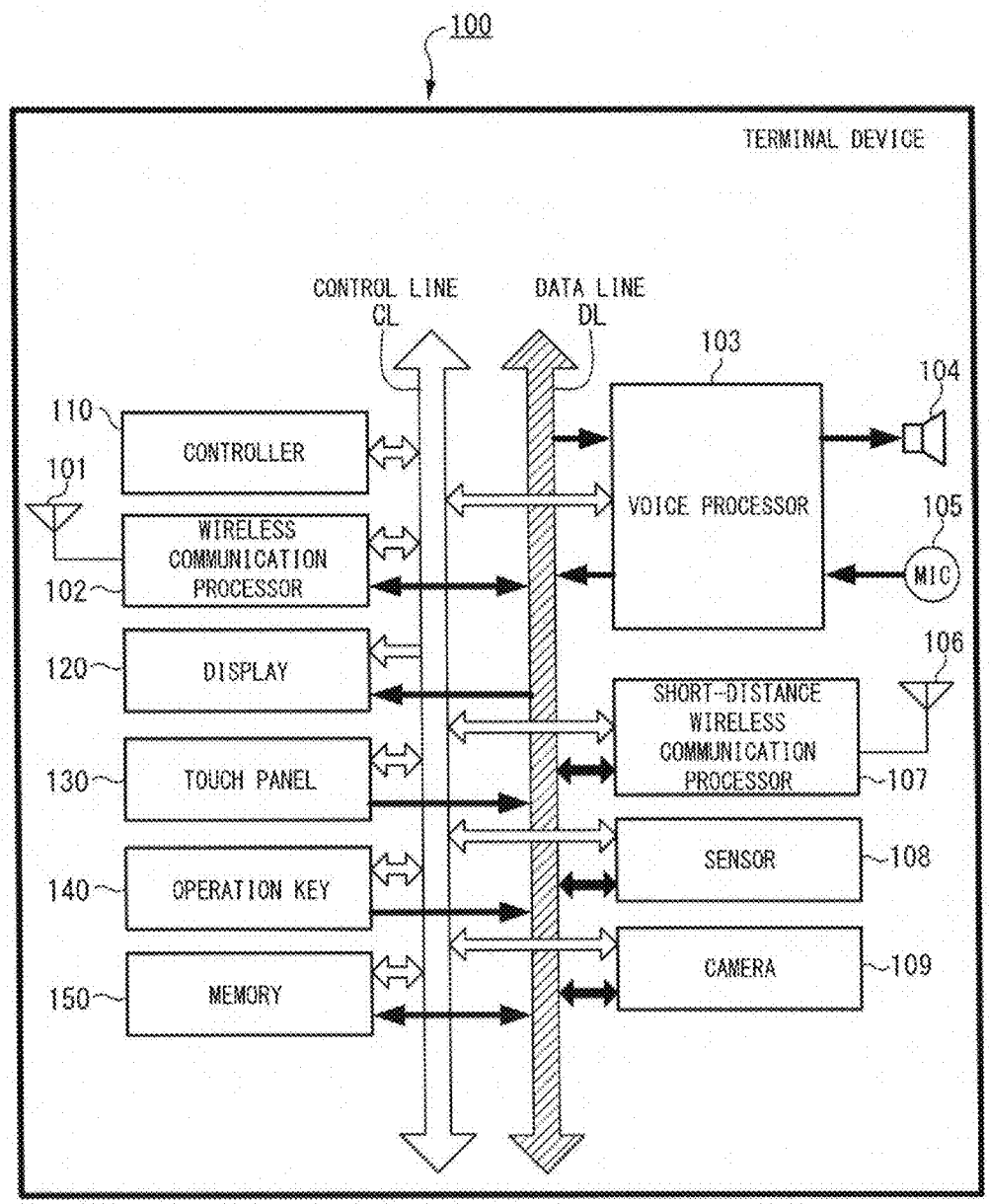
FIG. 2 illustrates a block diagram for an exemplary terminal device, according to certain embodiments.

Referring now to the drawings, wherein like reference numerals designate identical or corresponding parts throughout the several views.

FIGS. 1A-1C illustrate an outline of video processing performed in one or more embodiments in accordance with the present disclosure.

Referring first to FIG. 1A, FIG. 1A illustrates multiple angles-of-view in which image data is captured with respect to a panoramic image P10. In this example, the panoramic image P10 includes image data from angles-of-view F11-F15. That is, the angle-of-view at which a camera in this example captures video data may be any one of angle-of-views F11-F15. In addition, the darkened area in the panoramic image P10 represents areas of the panoramic image P10 in which image data is not captured using the camera.

FIG. 1B illustrates exemplary processing performed when changing an angle-of-view of a camera while capturing video data. Image data captured at a time at which the camera records the video image data is referred to herein as live image data. In this example, it is assumed that a camera initially captures live image data at an angle-of-view corresponding to F11 from FIG. 1A. The camera then pans to the right to capture live image data at the angle-of-view F12, and then the camera pans back to the left to capture live image data at angle-of-view F13. As shown in FIG. 1B, live image data is captured with respect to the front, right, and left sides of the camera as the camera is rotated while recording the video as described above. Accordingly, the angle-of-view in FIG. 1B at which live image data may be included in wide angle video data varies in accordance with the movement of the camera over time. Hereinafter, the term wide angle video data (or wide angle image data) may be utilized interchangeably with the term panoramic image/video data to describe image data having a relatively wide angle-of-view.

At a time during or after the capturing of the video data in the above example, the video data may be reproduced on a display included on a terminal device. For example, as shown in FIG. 1C, video data may be reproduced on a video reproduction apparatus 200, which is represented in this example as wearable glasses. It may be assumed that the video reproduction apparatus 200 includes various sensors for detecting a movement and determining an orientation of the video reproduction apparatus 200 (i.e. a movement of the user's head while wearing the glasses). For example, as shown in FIG. 1C, the sensors included in the video reproduction apparatus 200 may detect that an orientation of the user's head corresponding to a center angle-of-view of the panoramic image P10. The orientation of the video reproduction apparatus 200 may relate to the display angle-of-view when image data is reproduced on the apparatus.

As motion sensors included in the video reproduction apparatus 200 detect changes in the orientation of the video reproduction apparatus 200, control circuitry (e.g., a processor or microcontroller device) included in the apparatus may control the display outputting the panoramic image P10 such that the angle-of-view seen by the user changes. Here, if it is assumed that image data exists for a range P10' within the panoramic image P10, as the orientation of the video reproduction apparatus 200 changes, the displayed angle-of-view correspondingly changes to output image data within the range P10'. For example, when the user tilts his or her head upwards, image data above the center region Fa is reproduced in the video reproduction apparatus 200. Similarly, if the user moves his or her head left, right, or downwards, image data is reproduced in the video reproduction apparatus with a corresponding angle-of-view of the direction of motion of the user's head with respect to the center region Fa and the range P10'.

However, as discussed previously, live image data for a video may only be captured for a particular angle-of-view for any given time instant. Therefore, although the user may move his or her head such that the orientation of the video reproduction apparatus 200 changes, and although the output in the display may change angle-of-view in accordance with the orientation of the user's head, there may not necessarily exist live image data corresponding to the angle-of-view currently displayed in the video reproduction apparatus 200.

For this reason, live image data captured at a different time than the time corresponding to the current display time within the video may be utilized when reproducing wide angle video data at a given angle-of-view for the panoramic image P10. For example, when the user's head faces leftward during video reproduction such that the orientation of the video reproduction apparatus 200 changes to the left with respect to the center region Fa, the video reproduction apparatus 200 may reproduce video image data with an angle-of-view corresponding to angle-of-view F13. However, there may not exist live image data corresponding to the time at which the orientation of the video reproduction apparatus 200 changes to the left when reproducing the image data corresponding to the angle-of-view F13. Therefore, the image data used for reproducing the images in the angle-of-view F13 at this time may be set as make-up image data generated from live image data recorded at the angle-of-view F13 at a later time, as shown in FIG. 1B.

Referring to FIG. 1B, assuming the polygon shapes in the figure represent sequential video frames that may be included in wide angle video data, if a request was initially received to reproduce image data corresponding to the angle-of-view F13, control circuitry in the video reproduction apparatus 200 may determine that live image data does not exist in the angle-of-view F13 at the time at which reproduction of the image data is requested (i.e. live image data is initially captured from angle-of-view F11 in the example of FIG. 1B). However, the control circuitry of the video reproduction apparatus 200 may determine that live image data was captured for the angle-of-view F13 at a later time. Based on this determination, make-up image data may be generated for the angle-of-view F13 using the live image data captured for the angle-of-view F13 as the later time, and the make-up image data for the angle-of-view F13 may be reproduced in a wide angle video at a time corresponding to the time at which the live image data for angle-of-view F11 was captured. Similar processing may also be performed for generating make-up image data corresponding to the angle-of-view F12 (or another arbitrary angle-of-view). Accordingly, wide angle video data may be reproduced based on a combination of live image data and make-up image data corresponding to the various angle-of-views captured by the camera.

In one or more embodiments, the make-up image data in the generated wide angle video data may be displayed during reproduction until a time corresponding to the time when the make-up image data was captured live. That is, when make-up image data is displayed in wide angle video data in lieu of live image data (e.g., because live image data is not represented for an angle-of-view requested when displaying the wide angle video data), the video reproduction apparatus 200 may be in a state in which still image data corresponding to the make-up image data is displayed (e.g., the "no update" state shown in FIG. 1B).

Next, FIG. 2 illustrates a block diagram for an exemplary terminal device, according to certain embodiments of the present disclosure. For simplicity, the terminal device illustrated in FIG. 2 is implemented as a mobile phone terminal device in examples described herein. However, the skilled artisan will appreciate that the processing described herein may be easily adapted for other types of devices (e.g. a desktop computer, a tablet device, a laptop computer, a server, an e-reader device, a camera, a navigation unit, etc.).

Referring now to FIG. 2, the exemplary terminal device 100 of FIG. 2 includes a controller 110, a wireless communication processor 102 connected to an antenna 101, a voice processor 103, a speaker 104, a microphone 105, a short distance wireless communication processor 107 connected to an antenna 106, a motion sensor 108, a camera 109, a display 120, a touch panel 130, an operation key 140, and a memory 150.

The antenna 101 transmits/receives electromagnetic wave signals between base stations for performing radio-based communication, such as the various forms of cellular telephone communication.

The wireless communication processor 102 controls communications performed between the terminal device 100 and other external devices via the antenna 101. For example, the wireless communication processor 102 may control communication between base stations for cellular telephone communication.

The voice processor 103 demodulates and/or decodes the audio data read from the memory 150, or audio data received by the wireless communication processor 102 and/or short-distance wireless communication processor 107. Additionally, the voice processor 103 may decode audio signals received from the microphone 105.

The speaker 104 emits an audio signal corresponding to audio data supplied from the voice processor 103.

The microphone 105 detects surrounding audio, and converts the detected audio into an audio signal. The audio signal may then be output to the voice processor 103 and/or the controller 110 for further processing.

The antenna 106 may transmit/receive electromagnetic wave signals to/from other external apparatuses, and the short-distance wireless communication processor 107 may control the wireless communication performed with the other external apparatuses. Bluetooth, IEEE 802.11, and near field communication (NFC) are non-limiting examples of wireless communication protocols that may be used for inter-device communication via the short-distance wireless communication processor 107.

The sensor 108 may include one or more motion sensors capable of determining various aspects of motion with respect to the terminal device 100. For example, the sensor 108 may include one or more gyroscopes, accelerometers, or the like. In certain embodiments, the controller 110 may determine an orientation of the terminal device 100 based on motion sensor inputs received from the motion sensor 108. The orientation of the terminal device 100 may be represented in one or more embodiments as a tilt angle of the terminal device 100 with respect to one or more axes (e.g., the x/y/z axis). In one or more embodiments, the orientation of the terminal device 100 may include an indication of whether the terminal device 100 is held in a landscape or portrait orientation. In one or more embodiments, the orientation of the terminal device 100 may correspond to an angle-of-view at a time of recording and/or reproducing image data with the terminal device 100.

Image data may be generated by the terminal device 100 via the camera 109, which may include one or more image sensors comprised of, e.g., a charged couple device (CCD), complementary metal oxide semiconductor (CMOS), or the like. For example, an image signal may be generated by the camera 109 when an image formed on a light-receiving surface through a lens is photoelectrically converted. The lens of the camera 109 may, for example, be arranged on a front end or back surface of the terminal device 100 when implemented as a mobile phone device or smartphone. The camera 109 may, in one or more embodiments, include one or more processing circuits for performing processing features with respect to still and/or moving image data. Additionally, the controller 110 may execute panoramic image processing features described herein with respect to the still and/or moving image data generated by the camera 109.

The controller 110 may include one or more central processing units (CPUs), and may control each element in the terminal device 100 to perform features related to communication control, audio signal processing, control for the audio signal processing, image processing and control, and other kinds of signal processing. The controller 110 may perform these features by executing instructions stored in the memory 150. Alternatively or in addition to the local storage of the memory 150, the features may be executed using instructions stored in an external device accessed on a network or on a non-transitory computer readable medium.

The display 120 may be a liquid crystal display (LCD), an organic electroluminescence display panel, or another display screen technology. In addition to displaying still and moving image data, the display 120 may display operational inputs, such as numbers or icons, which may be used for control of the terminal device 100. The display 120 may additionally display a graphical user interface with which a user may control one aspects of the terminal device 100. Further, the display 120 may display characters and images received by the terminal device 100 and/or stored in the memory 150 or accessed from an external device on a network. For example, the terminal device 100 may access a network such as the Internet and display text and/or images transmitted from a Web server.

The touch panel 130 may include a physical touch panel display screen and a touch panel driver. The touch panel 130 may include one or more touch sensors for detecting an input operation on an operation surface of the touch panel display screen. Used herein, the phrasing "touch operation" refers to an input operation performed by touching an operation surface of the touch panel display with an instruction object, such as a finger or stylus-type instrument. In the case where a stylus, or the like, is used in a touch operation, the stylus may include a conductive material at least at the tip of the stylus such that the sensors included in the touch panel 130 may detect when the stylus approaches/contacts the operation surface of the touch panel display (similar to the case in which a finger is used for the touch operation).

In one or more embodiments, the touch panel 130 may be disposed adjacent to the display 120 (e.g., laminated), or may be formed integrally with the display 120. The display 120 and the touch panel 130 may be surrounded by a protective casing, which may also enclose the other elements included in the terminal device 100.

In one or more embodiments, the touch panel 130 is a capacitance-type touch panel technology. In other embodiments, the touch panel 130 may be implemented using other touch panel types with alternative structures, such as resistance-type touch panels. In certain embodiments, the touch panel 130 may include transparent electrode touch sensors arranged in the x/y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the x direction and the y direction, and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object is within a predetermined distance from the operation surface of the touch panel display screen.

The operation key 140 may include one or more buttons similar to external control elements. The operation key 140 may generate an operation signal based on a detected input. The operation signals generated by the operation key 140 may be supplied to the controller 110 for performing related processing control of the terminal device 100. In certain aspects of the present disclosure, the processing and/or functions associated with external buttons and the like may be performed by the controller 110 in response to an input operation on the touch panel 130 in lieu of implementing the terminal device with external buttons in the operation key 140.

The terminal device 100 includes a control line CL and a data line DL as internal communication bus lines. Control data to/from the controller 110 may be transmitted through the control line CL. The data line DL may be used for transmission of voice data, display data, etc.

Figure 3:
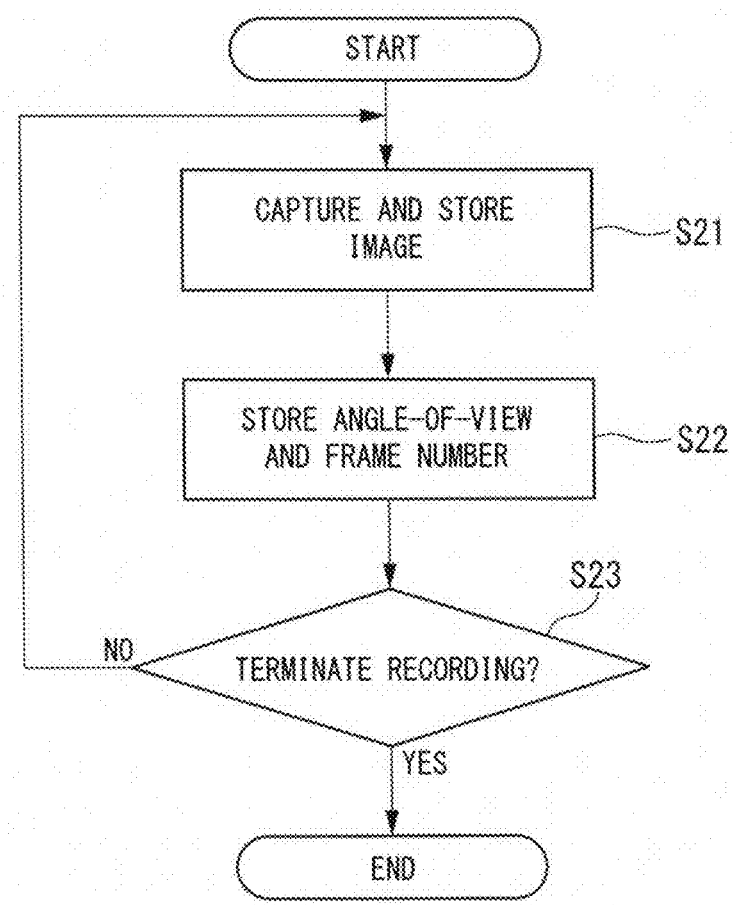
FIG. 3 illustrates an exemplary flow chart for generating and storing image data, according to certain embodiments.

Next, FIG. 3 illustrates an exemplary flow chart for generating and storing image data, in accordance with certain embodiments of the present disclosure. In one or more embodiments, the processing illustrated in FIG. 3 may be performed by the controller 110 and the camera 109.

Referring to FIG. 3, the process begins at step S21 where the camera 109 captures image data and stores the captured image data in the memory 150. In this example, it is assumed that one frame of image data is captured at step S21. Accordingly, when video data is captured at step S21, a series of frames may be captured and stored by repeating steps of FIG. 3 such that video data may be reproduced from the sequential frames corresponding to the captured image data.

In one or more embodiments, when capturing the image data with the camera 109, the camera 109 may determine an angle-of-view and a frame number corresponding to the frame of the image data captured by the camera. The angle-of-view and the frame number corresponding to the frame of the captured image data may be stored in the memory 150 at step S22. A frame number may be represented as a consecutive number beginning at a frame captured the start of recording and ending at a frame captured at the finish of recording. When capturing video data, the frame number may sequentially increase from the initial frame captured to the last frame captured in the video data. In one or more embodiments, the angle-of-view stored at step S22 may be generated by the sensor 108. That is, the angle-of-view stored at S22 may be generated based on a determined orientation of the terminal device 100 when the image data is captured.

At step S23, the controller 110 determines if the recording of image data has been terminated. For example, the controller 110 may determine at step S23 that the capturing of video data by the camera 109 has been completed based on an input received from the operation key 140 or a touch operation received on the touch panel 130. If recording has ended, the process of FIG. 3 is complete. Otherwise, the process returns to step S21 and additional frames of image data are captured to generate a video.

Next, FIG. 4 illustrates a non-limiting exemplary flow chart of processing related to the reproduction of video data stored in a memory, according to certain embodiments. In this example, the display 120 of the terminal device 100 may be utilized for reproducing the video data stored in the memory 150. Further, processing related to generating wide angle video data based on the live image data captured by the camera 109 may be performed under the control of the controller 110. Moreover, while the present example describes processing related to reproducing video data at a time that is subsequent to the time at which the image data is recorded, the processing in FIG. 4 may be adapted such that it is performed at other times, such as at a time corresponding to the recording of the image data.

At step S11, the controller 110 starts deploying images of all angles-of-view for generating and reproducing wide angle video data. Exemplary processing related to generating wide angle video data will be described in detail later at least with respect to FIG. 4.

Next, the controller 110 at step S12 determines an orientation of the terminal device 100 based on inputs received from the sensor 108. In one or more embodiments, the orientation determined at step S12 includes a viewing angle of the terminal device 100.

At step S13, the controller 110 reads out image data stored in the memory 150 that corresponds to the orientation determined at step S12. In one or more embodiments, the image data read out by the controller 110 at step S13 has a corresponding angle-of-view to the orientation determined at step S12.

At step S14, the controller 110 determines if an input is received indicating a termination of video reproduction. If an input is received indicating the termination of video data reproduction, the processing of FIG. 4 ends at this point. Otherwise, the controller 110 returns to step S12.

Next, FIG. 5 illustrates a non-limiting exemplary flow chart for generating wide angle video data, according to certain embodiments. The exemplary processing illustrated in FIG. 5 represents a process for generating wide angle video data based on a combination of live image data and make-up image data for a single frame. Therefore, the controller 110 may perform the process illustrated in FIG. 5 for a series of frames captured in a given time interval. In other words, the processing of FIG. 5 may be repeated for a series of frames such that wide angle video data for the series of frames is generated based on the combination of live image data and make-up image data.

At step S31, the controller 110 sets an angle-of-view for generating the wide angle video data. For example, assuming that the wide angle video data has a greater angle-of-view than one or more frames of image data used to generate the wide angle video data, the controller 110 at step S31 determines a portion of the greater angle-of-view in which to begin the processing of expanding the captured image to form the wide angle video data.

At step S32, the controller 110 determines whether live image data exists for the angle-of-view set at step S31. That is, the controller 110 determines whether live image data stored in the memory 150 has a corresponding angle-of-view to the angle-of-view set at step S31. If the controller 110 determines that live image data exists for the angle-of-view set at step S31, the controller 110 at step S33 sets the stored live image data as the image data utilized for generating the wide angle video data for the angle-of-view set at step S31. In other words, when the wide angle video data is reproduced when the angle-of-view set at step S31 is visible at a time corresponding to the present frame, live image data will be reproduced in an area of the wide angle video data corresponding to the angle-of-view set at step S31.

At step S34, if the controller 110 at step S32 determines that live image data does not exist for the time period corresponding to the present frame, the controller 110 at step S34 determines whether there is image data corresponding to the angle-of-view set at step S31 that was recorded at a time later than the time corresponding to the present frame. In other words, if the camera 109 is directed to an angle-of-view that does not correspond to the angle-of-view at step S31 and consequently live image data is recorded for an image data that does not correspond to the angle-of-view set at step S31, the controller 110 at step S34 determines whether the angle-of-view set at step S31 was recorded at a time later than the time at which the live image data for the present frame was recorded. That is, the controller 110 determines whether make-up image data may be generated for the angle of view set in step S31.

For example, referring to FIG. 1B, assume that the angle-of-view set at step S31 of FIG. 5 is angle-of-view F12 corresponding to the right side of the panoramic image P10. As illustrated in FIG. 1B, live image data for the first frame in a series of frames of image data represented in FIG. 1B exists only for the angle-of-view F11. Therefore, the controller 110 generates image data for the angle-of-view not represented by live image data by utilizing make-up image data that was recorded at a time subsequent to the time that the live image data for the present frame (i.e., the first frame in FIG. 1B) was recorded. As a result, wide angle video data may be generated in the first frame in the series of frames of FIG. 1B by combining the live image data from angle-of-view F11 with the makeup data from angles-of-view F12 and F13.

Referring back to FIG. 5, if the controller 110 determines at step S34 that live image data was not recorded at a time later than the present frame for the angle-of-view set at step S31, the controller 110 at step S36 generates the wide angle video data without image data in (i.e., without live image data or make-up image data) at the angle-of-view set at step S31. The condition of step S36 at FIG. 5 may correspond to the darkened area of the panoramic image P10 illustrated in FIG. 1A.

Otherwise, if the controller 110 determines at step S34 that live image data exists for the angle-of-view set at step S31 at a time subsequent to the time corresponding to the present frame, the controller 110 at step S35 sets the live image data recorded at the subsequent time as the image data deployed in the angle-of-view set at step S31 for the present frame. The process at step S35 may correspond to setting a make-up image for angle-of-views F12 and F13 in the example of FIG. 1B.

At step S37, the controller 110 determines whether the expansion of image data into all angles-of-view corresponding to the wide angle video data has been completed. If it is determined at step S37 that the wide angle video data has been generated for all angles-of-view in the frame, the process of FIG. 5 is complete for the present frame and the process illustrated in FIG. 5 is repeated for each subsequent frame in the time interval corresponding to the wide angle video data. Otherwise, if the controller 110 determines at step S37 that the wide angle video data has not been expanded into all of the angles-of-view included in the wide angle video data frame, the controller 110 returns to step S31 and repeats the process for a new angle-of-view that is not yet represented in the wide angle video frame.

Next, FIG. 6 illustrates an exemplary sequential flow diagram at a time of recording video data, according to certain embodiments. The example of FIG. 6 refers to processing performed by a video manager 110a, a file coupler 110b, and an encoder 110c, which may be included in the controller 110.

The sequence of FIG. 6 starts at step S101 where the controller 110 outputs a recording start instruction to the video manager 110a.

At step S102, the video manager 110a confirms the current angle-of-view and direction of the terminal device 100 with the sensor 108. The confirmation performed at step S102 may correspond to determining the orientation of the terminal device 100 at the time of recording the video data.

At step S103, the video manager 110a provides the terminal device's angle-of-view information to the file coupler 110b.

At step S104, the video manager 110a outputs an instruction to start recording video image data to the file coupler 110b, the encoder 110c, and the camera 109. Recording processing is then performed at step S110, which includes the processing steps S111 through S118 illustrated in FIG. 6.

At step S111, the camera 109 captures image data and outputs the image data to the encoder 110c.

At step S112, the encoder 110c encodes the captured image data received from the camera 109.

At step S113, the encoded video stream is output to the file coupler 110b, and the video stream is stored by the file coupler 110b in the memory 150.

At step S114, the file coupler 110b stores the angle-of-view information and frame number(s) associated with the video stream into another table that is different than the video stream.

If necessary, additional image data may be captured, encoded, and stored with associated angle-of-view and frame number information in steps S115 through S118. These steps may be repeated as many times as needed when recording the video data at a given angle-of-view.

Next, assume that the angle-of-view utilized when recording image data in the above steps changes at step 120. In response to the detected change of the angle-of-view, the processing of steps 121 through 128 is performed.

At step S121, the sensor 108 detects the angle-of-view of the terminal device 100 following the change.

At step S122, the sensor 108 outputs a notification of the angle-of-view change to the video manager 110a.

At step S123, the video manager 110a transmits a notification signal to the file coupler 110b indicating the change in the angle-of-view information.

At step S124, the video manager 110a outputs an intra-frame request to the encoder 110c.

At step S125, the camera 109 captures image data at the new angle-of-view and transmits the captured image data to the encoder 110c.

At step S126, the encoder 110c encodes the image data received from the camera 109.

At step 127, the video stream encoded by the encoder 110c is transmitted to the file coupler 110b, and the file coupler 110b stores the encoded video stream in the memory 150.

At step S128, the file coupler 110b stores the angle-of-view information and frame number(s) associated with the encoded video stream into a table that is different than the stored video stream.

At step S132, the controller 110 outputs an instruction to the video manager 110a instructing the video manager 110a to stop recording image data.

At step S133, the video manager 110a outputs an instruction to stop recording image data the file coupler 110b, the encoder 110c, and the camera 109.

At step S134, the encoder 110c encodes the image data supplied to the encoder at step S131.

At step S135, the video stream encoded by the encoder 110c is output to the file coupler 110b, and the file coupler 110b stores the video stream in the memory 150.

At step S136, the file coupler 110b stores angle-of-view information and frame number(s) associated with the stored video stream in a table that is different than the stored video stream.

At step S137, the encoder 110c outputs a notification to the file coupler 110b indicating a completion of encoding.

At step S138, the file coupler 110b completes the storage of the video image data file generated in the previous steps.

Next, FIG. 7 illustrates an exemplary flow diagram of image data processing at a time of video reproduction, according to certain embodiments. The exemplary flow diagram of FIG. 7 refers to processing performed by the video manager 110a, a file decoupler 110d, and a decoder 110e, which may be included in the controller 110.

At step S201, the controller 110 outputs an instruction to the video manager 110a indicating a start of image data reproduction.

At step S202, the video manager 110a outputs an instruction to the sensor 108 requesting confirmation of the current angle-of-view and direction of the terminal device 100. The information obtained at step S202 may indicate the orientation of the terminal device 100 during video reproduction.

At step S203, the video manager 110a outputs an instruction to the file decoupler 110d to begin generating wide angle video data based on all frames of video data corresponding to all angles-of-view stored in the memory 150 for a given video sequence. In one or more embodiments, the processing performed at step S203 may correspond to the processing illustrated and described above with respect to FIG. 5.

At step S204, the decoder 110e decodes all frames of video data of all angles-of-view represented in the wide angle video data.

At step S205, the controller 110 controls the display 120 such that the display 120 displays all frames of the wide angle video data in a 360-degree (or another angle corresponding to the total wide angle video data field of view) view with the current viewing direction as the center of the view. The current viewing direction of the terminal device 100 is determined based on the information obtained above at step S202. In one or more embodiments, the displayed wide angle video data from step S205 may be displayed with another position utilized as the center of the displayed image. For example, the wide angle video data may be displayed such that the midpoint of the angle-of-view range of the wide angle video data is the center position when the video is displayed.

At step S206, the video manager 110a outputs an instruction to the file decoupler 110d to start a decoding process for video reproduction.

At step S207, the video manager 110a outputs an instruction to the decoder 110e to start a decoding process for video reproduction.

As video reproduction processing is performed in the terminal device 100 using image data stored in the memory 150, the video reproduction processing continues at step S210, where the steps S211 through S214 are performed repeatedly, as needed.

At step S211, the file decoupler 110d reads out angle-of-view information and frames corresponding to the angle-of-view received at step S202.

At step S212, the file decoupler 110d transfers the read-out data from step S211 to the decoder 110e.

At step S213, the decoder 110e decodes the transferred video stream.

At step S214, the decoder 110e outputs the decoded video stream to the display 120, where it is displayed. If necessary, steps S211 through S214 may be repeated as steps S215 through S218 for subsequent video streams at a given angle-of-view.

Next, it is assumed that the orientation of the terminal device changes at step S220 (i.e., the reproduction angle-of-view changes). Steps S221 through S227 are performed in response to the change in the orientation of the terminal device 100.

At step S211, the sensor 108 detects an angle-of-view change of the terminal device 100.

At step S222, the sensor 108 outputs a notification of the angle-of-view change to the video manager 110a.

At step S223, the video manager 110a outputs a notification signal to the display 120 notifying the display that the angle-of-view for reproduction on the display 120 has changed.

At step S224, the file decoupler 110d reads out the frame(s) corresponding to the new angle-of-view, based on the notification received at step S222.

At step S225, the file decoupler 110d transfers the video stream corresponding to the new angle-of-view to the decoder 110e.

At step S226, the decoder 110e decodes the received video stream.

At step S227, the video stream decoded by the decoder 110e is transferred to the display 120, and the display 120 displays the transferred video stream.

The steps S221-S227 may be repeated for subsequent video streams corresponding to the new angle-of-view.

At step S231, the controller 110 outputs an instruction to the video manager 110a to stop reproducing image data. In response to receiving the instruction to stop reproducing image data, the video manager 110a outputs an instruction to stop reproducing image data to the file decoupler 110d and the decoder 110e at step S232.

Figure 8A:
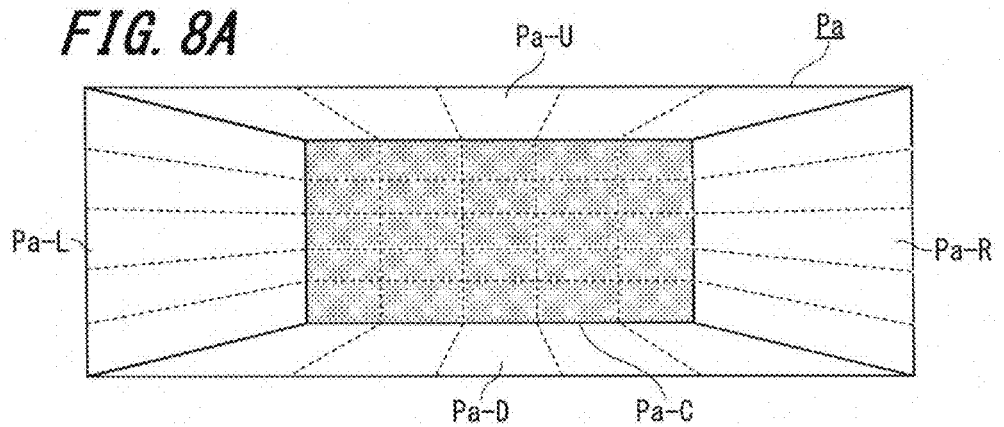
FIGS. 8A through 8C illustrate exemplary reproduction states of panoramic image data, according to certain embodiments.
Figure 8B:
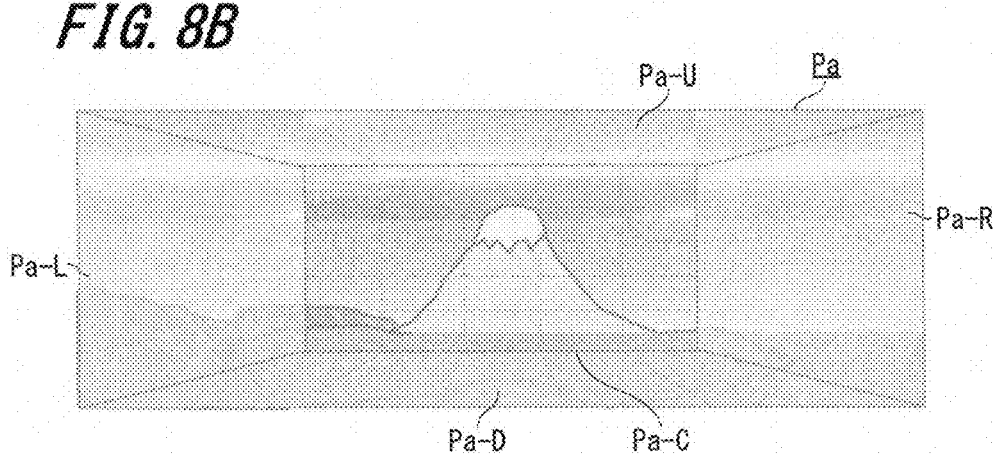
Figure 8C:
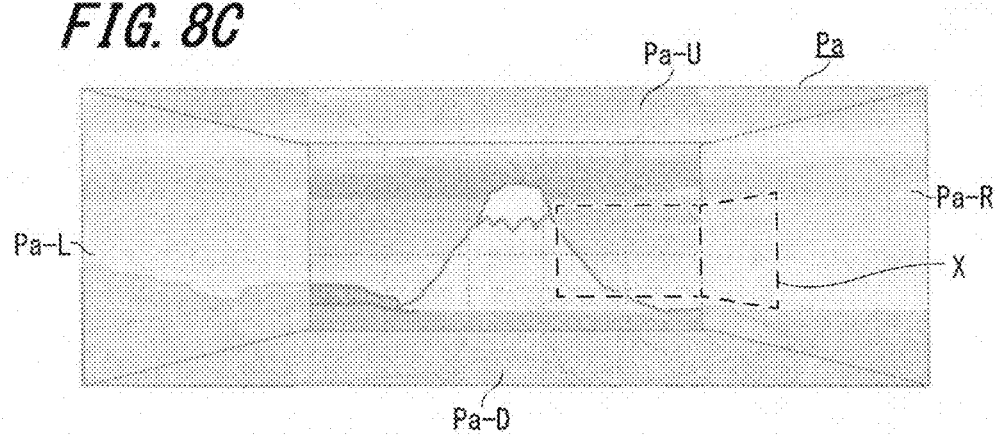

Next, FIGS. 8A through 8C illustrate exemplary reproduction states of panoramic image data, according to certain embodiments. The panoramic image data illustrated in FIGS. 8A through 8C includes a plurality of frames of image data that may correspond to a combination of live image data and make-up image data processed to form wide angle video data in accordance with the present disclosure. For the purposes of the present example, the various frames illustrated in FIGS. 8A through 8C are assumed to be of a corresponding size to an angle-of-view at which the camera 109 is capable of capturing image data. The panoramic image data illustrated in FIGS. 8A through 8C is comprised of five frames; however, greater than or less than five frames may be utilized in other implementations of a device according to the present disclosure.

Referring first to FIG. 8A, panoramic image Pa includes image Pa-C corresponding to a frame at a center angle-of-view. Pa-R corresponds to an image frame at a right angle-of-view. Pa-U corresponds to an image frame at an upper angle-of-view. Pa-L corresponds to an image frame at a left angle-of-view. Pa-D corresponds to an image frame at a downward angle-of-view.

The center angle-of-view and the surrounding angle-of-views are arranged such that the image Pa is displayed in three dimensions in the example of FIGS. 8A-8C, and it is assumed that the display 120 of the terminal device 100 is capable of displaying image data in accordance with this example.

FIG. 8B illustrates one frame of image data at each of the angle-of-view locations included within the panoramic image Pa. In the example of FIG. 8B, the image frame displayed in the position corresponding to the center angle-of-view is displayed at a different brightness level than the other displayed frames included in the panoramic image Pa. For example, the image displayed in the angle-of-view corresponding to Pa-C may be displayed at higher brightness than the surrounding images in the other angle-of-views. Other techniques may be implemented for distinguishing one or more of the image frames in a panoramic image from a remaining set of image frames. For example, the image frame corresponding to Pa-C may be displayed normally while the surrounding image frames are displayed in a semitransparent state.

FIG. 8C illustrates an example of delineating live image data within a panoramic image. In this example, the controller 110 controls the display 120 such that a frame X is displayed within the panoramic image Pa, whereby the frame X indicates that the video image data displayed within the frame X is live image data. Accordingly, the display of live image data and make-up image data corresponding to the remaining portion of the panoramic image may be easily distinguished when viewing the image Pa.

Next, FIGS. 9A and 9B illustrate exemplary relationships between a recording angle-of-view of a captured image and a reproduction angle-of-view of a displayed image, according to certain embodiments.

Referring first to FIG. 9A, FIG. 9A illustrates an example of an angle-of-view at a time of recording image data with the terminal device 100, and a relationship between the angle-of-view at the time of recording and the image being captured. As shown in FIG. 9A, it is assumed that the image data in this example is captured by rotating the terminal device 100 by 180-degrees while recording the image data. Changes in live image data captured as the terminal device 100 is rotated in the example of FIG. 9A are shown above the illustration of the terminal device.

Referring now to FIG. 9B, FIG. 9B illustrates the angle (direction) of the terminal device 100 at the time of reproducing video image data, and a relationship with the image displayed at the various reproduction angles-of-view. It is assumed for the purposes of FIG. 9B that the video is reproduced on a display included in wearable glasses, such as the video reproduction apparatus 200 illustrated in FIG. 1C. At the time of reproducing the video as shown in FIG. 9B, it is assumed that the video reproduction apparatus 200 remains substantially fixed in a state without motion. Further, each image shown in FIG. 9A and each image shown in FIG. 9B are images of the same timing for each of the illustrated rotation angles. Moreover, it is assumed that the size of the image reproduced with the eyeglasses-type video reproduction apparatus 200 is the same as that of one frame which was recorded with the terminal device 100.

As shown in FIG. 9B, the reproduced image in each timing changes. That is, the video reproduction apparatus 200 only displays the live image data LV when the angle-of-view recorded with the terminal device 100 corresponds with the reproduction angle-of-view of the video reproduction apparatus 200. At the timings at which the angle-of-view of reproduction and the angle-of-view at the time of recording the image data do not correspond, the video reproduction apparatus 200 displays a combination of live image data LV and make-up image data MV, or the video reproduction apparatus 200 may only display the make-up image data MV. It should be noted that while the make-up image data MV in this example is illustrated as a darkened area when displayed on the video reproduction apparatus 200, this is merely for illustration purposes, and the actual make-up image data may represent a scene captured at a subsequent time to the live image data LV.

Next, as mentioned above, wide angle video data may include a combination of live image data and make-up image data, whereby the make-up image data may be displayed as still image data. However, in certain implementations, the controller 110 may control the display 120 such that make-up image data displayed within wide angle video data is displayed with simulated motion. For example, FIGS. 10A and 10B illustrate an example of simulating motion with a make-up image displayed within wide angle video data, according to certain embodiments.

Figure 10A:
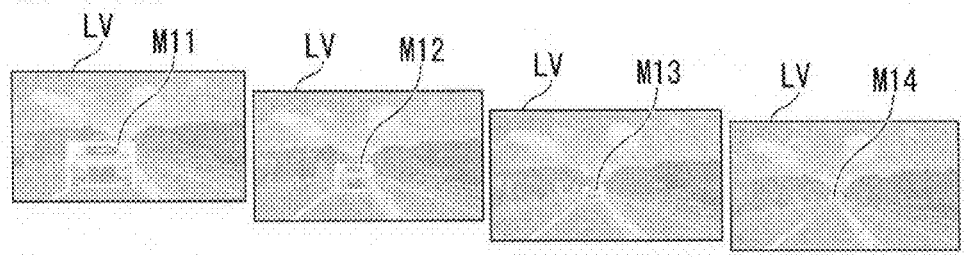
FIGS. 10A and 10B illustrate an example of simulating motion of a make-up image displayed within wide angle video data, according to certain embodiments.

Referring first to FIG. 10A, FIG. 10A illustrates make-up image data M11-M14 corresponding to a motor vehicle driving on a road within live image data LV. Specifically, make-up image data M11, M12, M13, and M14 are displayed sequentially within frames of the live image data LV. As illustrated in the figure, motion of the make-up image data may be simulated by changing one or more of a display position or display size of the moving image data within the live image data.

Figure 10B:
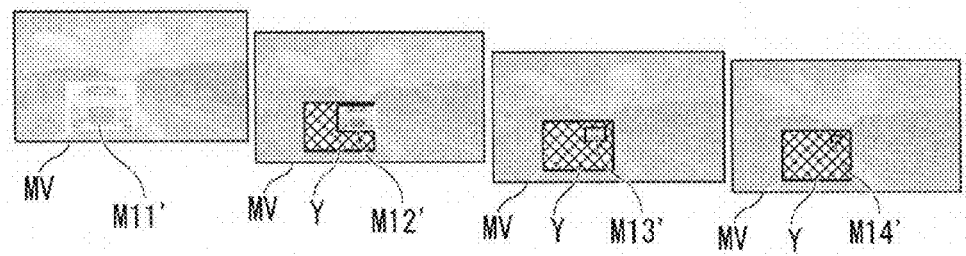

For example, as shown in FIG. 10B, there may be a case in which motor vehicle image M11' is included within make-up image MV. In certain implementations, the controller 110 may control the display such that the make-up image MV (or M11') is reduced in size gradually over time, resulting in motor vehicle images M12', M13', and M14'. Thus, when the motor vehicle images in FIG. 10B are viewed in sequential frames, the decreasing/increasing size of the motor vehicle image simulates motion of the motor vehicle on the road. Additionally, in certain embodiments, when motor vehicle images M12', M13', and M14', which are reduced versions of image M11', are combined with the make-up image MV, a non-display section Y is generated based on the difference between the sizes of the images. In certain embodiments, this non-display section Y may be displayed in black, or may be displayed in another color such as the color of a road, the color of a sky, etc.

Figure 11A:
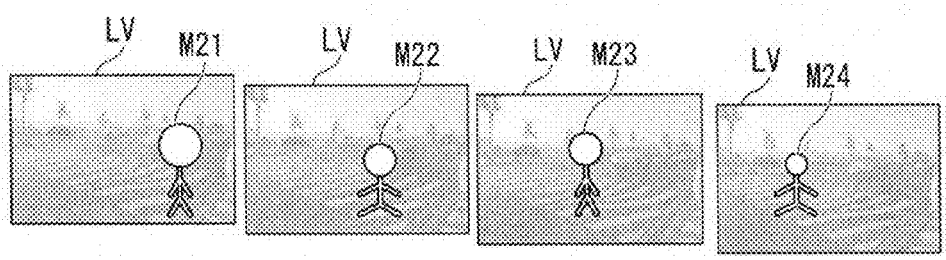
FIGS. 11A through 11C illustrate another non-limiting example of simulating motion of a make-up image within wide angle video data, according to certain embodiments.
Figure 11B:
Figure 11C:
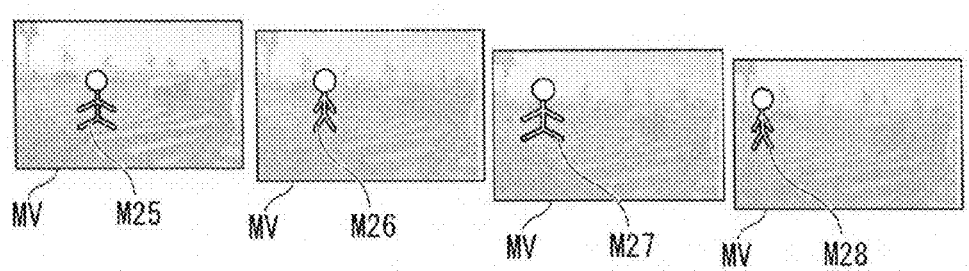

Next, FIGS. 11A through 11C illustrate another non-limiting example of simulating motion of a make-up image within wide angle video data, according to certain embodiments.

Referring first to FIG. 11A, FIG. 11A illustrates an example in which make-up image data corresponding to a human figure is displayed sequentially within live image data LV. Specifically, make-up images M21, M22, M23, and M24 illustrate a human figure that appears to be in motion with respect to the backdrop of live image data LV. For example, as shown in FIG. 11B, a motion of the human figure in make-up images M21 through M24 may be simulated in a walking motion by changing a display size and/or display position of the figure in a repeating pattern corresponding to patterns PT1 and PT2. Further, as illustrated in FIG. 11B, aspects of the make-up images may be varied in their entirety, or a portion thereof may be changed in size/position to simulate the motion. In the example shown in FIG. 11C, human figures representing make-up images M25, M26, M27, and M28 within make-up image MV are shown, whereby the images M25 and M27 correspond to the shapes of pattern PT2 and the images M26 and M28 correspond to the pattern PT1. By varying the make-up image data as illustrated in FIGS. 11A through 11C, the display 120 may output make-up image data including images of human figures such as images M25 through M28 such that variations in the make-up image data appear as simulated motion within other image data.

Next, FIG. 12 illustrates a non-limiting exemplary sequential flow diagram for simulating motion with a make-up image, according to certain embodiments. The sequential flow diagram of FIG. 12 may correspond to the simulated motion illustrated and discussed above with respect to FIGS. 10A-11B. The flow diagram of FIG. 12 includes steps discussed above with respect to FIG. 6. Accordingly, for the sake of brevity, a description of these steps will not be repeated here. Steps S141 through S144 are added in FIG. 12. Moreover, FIG. 12 illustrates processing with respect to an object tracker 110f, which may be included in the controller 110.

The object tracker 110f may perform image analysis such that an object within an image is detected and extracted. Exemplary objects that may be detected within an image include a human figure, a motor vehicle, or another arbitrary object.

At step S141, an image is captured with the camera 109 and the captured image is transferred to the object tracker 110f.

At step S142, the object tracker 110f analyzes the image and detects an object within the image.

At step S143, the object tracker 110f transfers the pattern of the detected object from the image to the file coupler 110b.

At step S144, the file coupler 110b stores the pattern of the detected object in the memory 150.

Next, FIG. 13 illustrates a non-limiting exemplary sequential flow diagram for reproducing images with simulated motion from a make-up image, according to certain embodiments. The sequential flow diagram of FIG. 13 may correspond to the simulated motion illustrated and discussed above with respect to FIGS. 10A-11B. The exemplary flow diagram of FIG. 13 includes steps that were illustrated and discussed above with respect to FIG. 7. Accordingly, the repeated steps will not be described here for the sake of brevity. Steps S241 through S244 are added from FIG. 7. Moreover, the flow diagram from FIG. 13 describes processing with respect to a pattern reproducer 110g, which may be included in the controller 110. Using patterns stored in the memory 150 (as discussed above with respect to FIG. 12), the pattern reproducer 110g may generate a pattern (object) for reproduction by combining the pattern with another image during the reproduction.

At step S241, the file decoupler 110d reads the pattern saved in the memory 150.

At step S242, the file decoupler 110d transfers the read pattern to the pattern reproducer 110g.

At step S243, the pattern reproducer 110g reproduces the pattern combined in another image, such as live image data or another make-up image.

At step S244, the pattern reproducer 110g outputs the reproduced pattern combined with the other image data to the display 120, and the display 120 outputs the image with the reproduced pattern.

Figure 14:
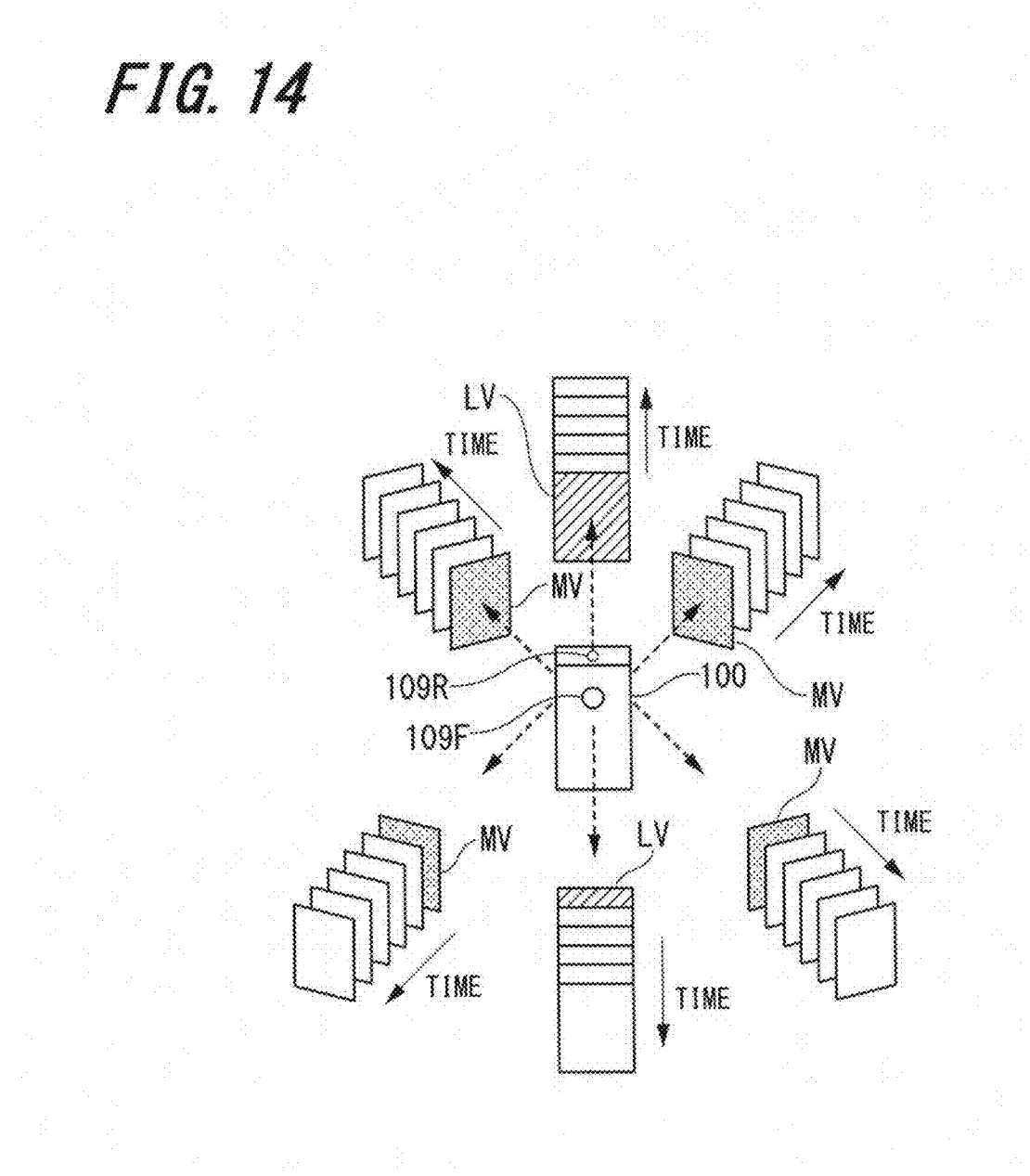
FIG. 14 illustrates a non-limiting example of capturing image data with cameras mounted on multiple sides of a terminal device, according to certain embodiments.
Figure 15:
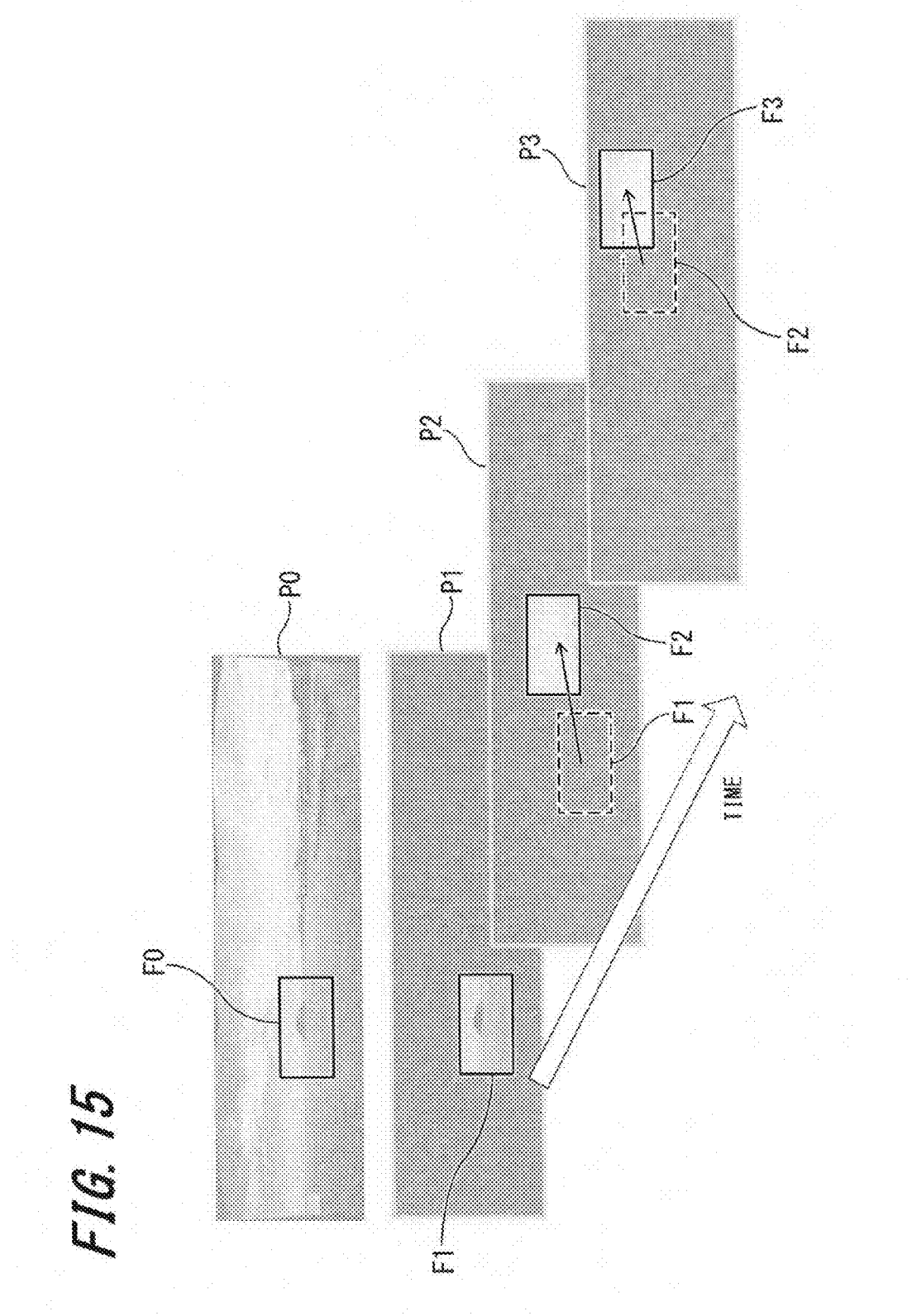
FIG. 15 illustrates exemplary panoramic image data.

Next, FIG. 14 illustrates a non-limiting example of capturing image data with cameras mounted on multiple sides of a terminal device, according to certain embodiments. In this example, it is assumed that a front facing camera 109F is mounted on a front surface of the terminal device 100 and a rear facing camera 109R is mounted on a rear surface of the terminal device 100. Accordingly, by providing cameras mounted on the terminal device 100 as shown in FIG. 14, when capturing panoramic image data around the terminal device 100, the live image data LV may be obtained with respect to two angles-of-view for each timing at which the image data is captured. Accordingly, when performing processing described herein and generating wide angle video data in accordance with the present disclosure, the angle-of-view represented by the live image data LV may increase, and as a result, the amount of the make-up image data MV used to generate the wide angle video data may decrease.

For example, as shown in FIG. 14, it is assumed that the total angle-of-view of wide angle video data generated with the terminal device 100 is 360-degrees, comprising frames from a total of six angles-of-view. By capturing image data from multiple angles as in FIG. 14, live image data LV may be captured from two of the six angles-of-view. The four remaining angles-of-view may be comprised of make-up image data MV.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

Further, the generation of wide angle video data such as the process shown in FIG. 5 may be performed at a time of recording image data rather than a time of reproducing image data for display. In one or more embodiments, a terminal device may be made to perform a wide angle video data generation process at a time other than recording or reproduction.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

Moreover, the reproduced images in FIG. 8 and the other figures are merely examples, and the reproduction of image data may be performed such that the display outputs images differently than these examples.

Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A device comprising: one or more image sensors that capture live video data; a memory that stores the captured live video data; circuitry configured to determine an angle-of-view for one or more frames of the live video data; generate wide angle video data that has a larger angle-of-view than the one or more frames of the live video data; determine one or more angles-of-view not represented in the wide angle video data by the live video data; generate make-up image data captured at a later time than the live video data, wherein the make-up image data has an angle-of-view corresponding to at least one of the one or more angles-of-view that are not represented in the wide angle video data by the live video data; and update the wide angle video data to include the make-up image data.

(2) The device of (1), wherein the one or more image sensors are configured to generate a frame number for each frame of the live video data and to store the frame number with the live video data in the memory.

(3) The device of (1) or (2), wherein the circuitry is further configured to generate the wide angle video data by including the make-up image data at a corresponding frame number of the live image data.

(4) The device of any one of (1) to (3), wherein the circuitry is further configured to continuously include the make-up image data in the wide angle video data until a time corresponding to when the make-up image data was captured live.

(5) The device of any one of (1) to (4), further comprising a display, wherein the circuitry is further configured to control the display such that the wide angle video data is displayed on the display.

(6) The device of any one of (1) to (5), wherein the circuitry is further configured to control the display such that when the wide angle video data is displayed, a portion of the wide angle video is displayed differently than a remaining portion of the wide angle video data.

(7) The device of any one of (1) to (6), further comprising one or more sensors configured to determine an orientation of the device, wherein the circuitry is further configured to control the display, based on the determined orientation of the device, such that the portion of the wide angle video data that is displayed differently has an angle-of-view corresponding to the orientation of the device.

(8) The device of any one of (1) to (7), wherein the circuitry is further configured to control the display such that the portion of the wide angle video data is displayed with a different brightness level than the remaining portion of the wide angle video data.

(9) The device of any one of (1) to (8), further comprising one or more sensors configured to determine an orientation of the device, wherein the circuitry is further configured to control the display, based on the determined orientation of the device, such that a portion of the wide angle video data that corresponds to the live video data is delineated on the display.

(10) The device of any one of (1) to (9), wherein the portion of the wide angle video data that corresponds to the live video data changes as the orientation of the device changes.

(11) The device of any one of (1) to (10), wherein the circuitry is further configured to control the display such that when the orientation of the device corresponds to an angle-of-view in the wide angle video data that is not represented by the live video data, make-up image data is displayed in the angle-of-view that is not represented by the live video data.

(12) The device of any one of (1) to (11), wherein the display is implemented in wearable glasses.

(13) The device of any one of (1) to (12), wherein the circuitry is further configured to generate the wide angle video data by varying, for sequential frames of the wide angle video data, one or more of a size and an orientation of a portion of the displayed make-up image data.

(14) The device of any one of (1) to (13), wherein the portion of the make-up image data is varied such that the portion appears to be moving when the wide angle video data is displayed.

(15) The device of any one of (1) to (14), wherein the circuitry is further configured to detect when the portion of the make-up image data corresponds to a human figure.

(16) The device of any one of (1) to (15), wherein the circuitry is further configured to repetitively vary the one or more of the size and the orientation of the portion of the make-up image data when it is determined that the portion corresponds to the human figure.

(17) The device of any one of (1) to (16), wherein: the device includes at least two image sensors, and the at least two image sensors are configured to simultaneously capture the live video data from their respective angles-of-view.

(18) The device of any one of (1) to (17), wherein at least one pair of the at least two image sensors are oriented on opposing sides of the device.

(19) A method comprising: receiving, from one or more image sensors, live video data captured by the one or more image sensors; storing the live video data in a memory; determining, by circuitry, an angle-of-view for one or more frames of the live video data; generating, by the circuitry, wide angle video data that has a larger angle-of-view than the one or more frames of the live video data; determining, by the circuitry, one or more angles-of-view not represented in the wide angle video data by the live video data; generating, by the circuitry, make-up image data captured at a later time than the live video data, wherein the make-up image data has an angle-of-view corresponding to at least one of the one or more angles-of-view that are not represented in the wide angle video data by the live video data; and updating, by the circuitry, the wide angle video data to include the make-up image data.

(20) A non-transitory computer readable medium having instructions stored therein that when executed by one or more processors cause a device to perform a method comprising: receiving, from one or more image sensors, live video data captured by the one or more image sensors; storing the live video data in a memory; determining an angle-of-view for one or more frames of the live video data; generating wide angle video data that has a larger angle-of-view than the one or more frames of the live video data; determining one or more angles-of-view not represented in the wide angle video data by the live video data; generating make-up image data captured at a later time than the live video data, wherein the make-up image data has an angle-of-view corresponding to at least one of the one or more angles-of-view that are not represented in the wide angle video data by the live video data; and updating the wide angle video data to include the make-up image data.

The invention claimed is:
1. A device comprising:
one or more image sensors that capture live video data;
a memory that stores the captured live video data;
circuitry configured to
    determine an angle-of-view for one or more frames of the live video data;
    generate wide angle video data that has a larger angle-of-view than the one or more frames of the live video data;
    determine one or more angles-of-view not represented in the wide angle video data by the live video data;
    generate make-up image data captured at a later time than the live video data, wherein the make-up image data has an angle-of-view corresponding to at least one of the one or more angles-of-view that are not represented in the wide angle video data by the live video data; and
    update the wide angle video data to include the make-up image data.
2. The device of claim 1, wherein
the one or more image sensors are configured to generate a frame number for each frame of the live video data and to store the frame number with the live video data in the memory.

3. The device of claim 2, wherein
the circuitry is further configured to generate the wide angle video data by including the make-up image data at a corresponding frame number of the live image data.

4. The device of claim 1, wherein
the circuitry is further configured to continuously include the make-up image data in the wide angle video data until a time corresponding to when the make-up image data was captured live.

5. The device of claim 1, further comprising
a display, wherein
the circuitry is further configured to control the display such that the wide angle video data is displayed on the display.

6. The device of claim 5, wherein
the circuitry is further configured to control the display such that when the wide angle video data is displayed, a portion of the wide angle video is displayed differently than a remaining portion of the wide angle video data.

7. The device of claim 6, further comprising
one or more sensors configured to determine an orientation of the device, wherein
the circuitry is further configured to control the display, based on the determined orientation of the device, such that the portion of the wide angle video data that is displayed differently has an angle-of-view corresponding to the orientation of the device.

8. The device of claim 6, wherein
the circuitry is further configured to control the display such that the portion of the wide angle video data is displayed with a different brightness level than the remaining portion of the wide angle video data.

9. The device of claim 5, further comprising
one or more sensors configured to determine an orientation of the device, wherein
the circuitry is further configured to control the display, based on the determined orientation of the device, such that a portion of the wide angle video data that corresponds to the live video data is delineated on the display.

10. The device of claim 9, wherein
the portion of the wide angle video data that corresponds to the live video data changes as the orientation of the device changes.

11. The device of claim 10, wherein
the circuitry is further configured to control the display such that when the orientation of the device corresponds to an angle-of-view in the wide angle video data that is not represented by the live video data, make-up image data is displayed in the angle-of-view that is not represented by the live video data.

12. The device of claim 5, wherein
the display is implemented in wearable glasses.

13. The device of claim 1, wherein
the circuitry is further configured to generate the wide angle video data by varying, for sequential frames of the wide angle video data, one or more of a size and an orientation of a portion of the displayed make-up image data.

14. The device of claim 13, wherein
the portion of the make-up image data is varied such that the portion appears to be moving when the wide angle video data is displayed.

15. The device of claim 13, wherein
the circuitry is further configured to detect when the portion of the make-up image data corresponds to a human figure.

16. The device of claim 15, wherein
the circuitry is further configured to repetitively vary the one or more of the size and the orientation of the portion of the make-up image data when it is determined that the portion corresponds to the human figure.

17. The device of claim 1, wherein:
the device includes at least two image sensors, and
the at least two image sensors are configured to simultaneously capture the live video data from their respective angles-of-view.

18. The device of claim 17, wherein
at least one pair of the at least two image sensors are oriented on opposing sides of the device.

19. A method comprising:
receiving, from one or more image sensors, live video data captured by the one or more image sensors;
storing the live video data in a memory;
determining, by circuitry, an angle-of-view for one or more frames of the live video data;
generating, by the circuitry, wide angle video data that has a larger angle-of-view than the one or more frames of the live video data;
determining, by the circuitry, one or more angles-of-view not represented in the wide angle video data by the live video data;
generating, by the circuitry, make-up image data captured at a later time than the live video data, wherein the make-up image data has an angle-of-view corresponding to at least one of the one or more angles-of-view that are not represented in the wide angle video data by the live video data; and
updating, by the circuitry, the wide angle video data to include the make-up image data.

20. A non-transitory computer readable medium having instructions stored therein that when executed by one or more processors cause a device to perform a method comprising:
receiving, from one or more image sensors, live video data captured by the one or more image sensors;
storing the live video data in a memory;
determining an angle-of-view for one or more frames of the live video data;
generating wide angle video data that has a larger angle-of-view than the one or more frames of the live video data;
determining one or more angles-of-view not represented in the wide angle video data by the live video data;
generating make-up image data captured at a later time than the live video data, wherein the make-up image data has an angle-of-view corresponding to at least one of the one or more angles-of-view that are not represented in the wide angle video data by the live video data; and
updating the wide angle video data to include the make-up image data.

* * * * *